April 23, 1957 E. O. RUHLIG 2,790,109

SHIFT REGISTER CIRCUITS

Filed Sept. 10, 1954

INVENTOR
E. O. RUHLIG DECEASED
ARTHUR J. RUHLIG
HIS ADMINISTRATOR
BY [signature]
ATTORNEY United States Patent Office 2,790,109

Patented Apr. 23, 1957

2,790,109

SHIFT REGISTER CIRCUITS

Earl O. Ruhlig, deceased, late of Summit, N. J., by Arthur J. Ruhlig, administrator, Clinton, Md., assignor to Bell Telephone Laboratories, Incorporated, New York, N. Y., a corporation of New York Application September 10, 1954, Serial No. 455,122

8 Claims. (Cl. 315—84.5)

Figure 1:
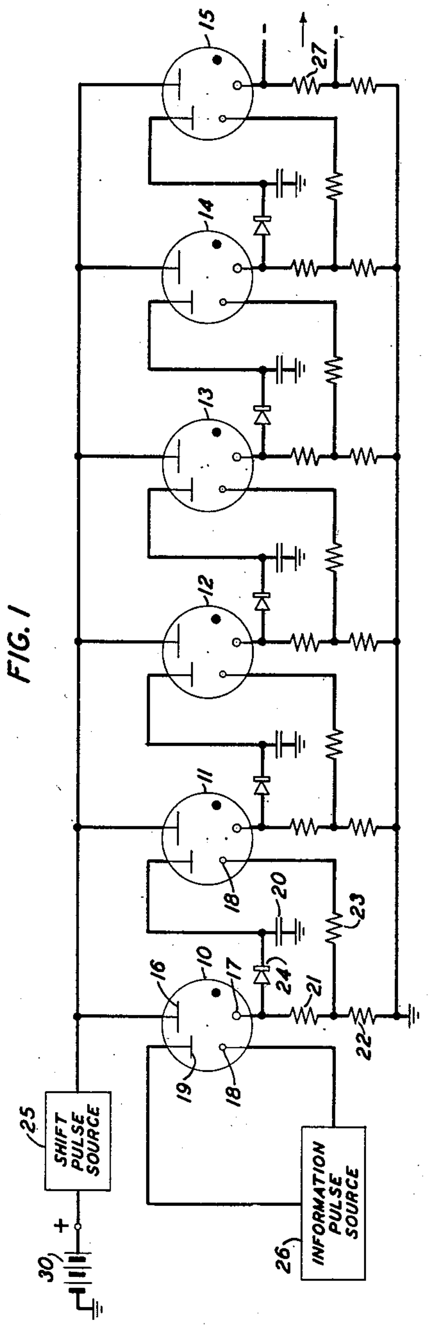

This invention relates to impulse responsive circuits including gaseous discharge devices and more particularly to shift register circuits.

In general, shift register circuits include an ordered array or series of elements or devices in which information may be stored in accordance with a code, each bit of information being represented by a particular and corresponding pattern of states of the elements or devices. For example, in a binary shift register wherein the elements are gaseous discharge devices, each bit of information is represented by a corresponding pattern of conducting and non-conducting devices, each of the conducting devices representing a "1" and the non-conducting a "0." In operation, the information represented at any particular time is stepped along the array in response to shift signals or pulses so that following each such signal or pulse a digit, i. e. a "1," is stored in each element immediately following one wherein a digit had been stored and no digit, i. e. a zero, appears in each device immediately succeeding one wherein no digit had been stored. Stated in another way, for the case wherein the storage elements are gaseous discharge devices, each shift signal or pulse concomitantly renders the conducting devices non-conducting and each immediately succeeding device conducting. Thus, in effect, any pattern present is shifted along the array one step in response to each shift signal or pulse.

At any time, the pattern and, hence, the information represented thereby may be read by detecting the signals at a group of the storage elements. Alternatively, the information may be read out in the form of pulses at one end of the array of elements.

General objects of this invention are to simplify and to increase the reliability of impulse responsive circuits.

In one illustrative embodiment of this invention, a shift register circuit comprises a series of gaseous discharge devices each having a main anode and cathode defining a main gap and an auxiliary anode and cathode defining a starter gap, a biasing source for applying a sustaining voltage across the main gaps, an information pulse source coupled to the starter gap of the first device in the series, and a shift pulse source for periodically reducing the voltage across the main gaps to below the sustaining value.

In accordance with one feature of this invention, the main gap circuit of each device is coupled to the starter gap of the next succeeding device in such manner as to apply a priming voltage to that starter gap while a discharge obtains in the main gap mentioned, of magnitude nominally sufficient to initiate a discharge in the starter gap, and also to bias the auxiliary cathode of the succeeding device such as to prevent breakdown of the starter gap by said priming voltage while the main gap discharge noted obtains.

More specifically, in accordance with one feature of this invention, a resistance divider and condenser network is coupled to the main gap of each device and to the starter gap of the next succeeding device, the condenser being connected to the starter anode. When a discharge is sustaining in the main gap, the condenser charges to the potential of the main cathode, the circuit parameters being such that the condenser potential is of magnitude somewhat above the breakdown potential for the starter gap. However, the network includes a resistor so constructed and arranged that when a discharge is sustaining in a main gap, the auxiliary cathode of the next succeeding device is biased positively by the drop across the resistor so that initiation of a discharge in the starter gap of that succeeding device is inhibited.

When a shift pulse is applied to the devices, any main gap discharge obtaining is interrupted. Consequently, the drop across the biasing resistor above noted disappears and any charged condenser discharges through the associated starter gap to establish a discharge therein. Upon cessation of the shift pulse, the main gap of each device of which the starter gap is conducting breaks down and a discharge sustains therein.

In accordance with another feature of this invention, a resistor is provided in the network above mentioned to prevent self priming of any device, thereby to prevent false operation thereof.

Figure 2:
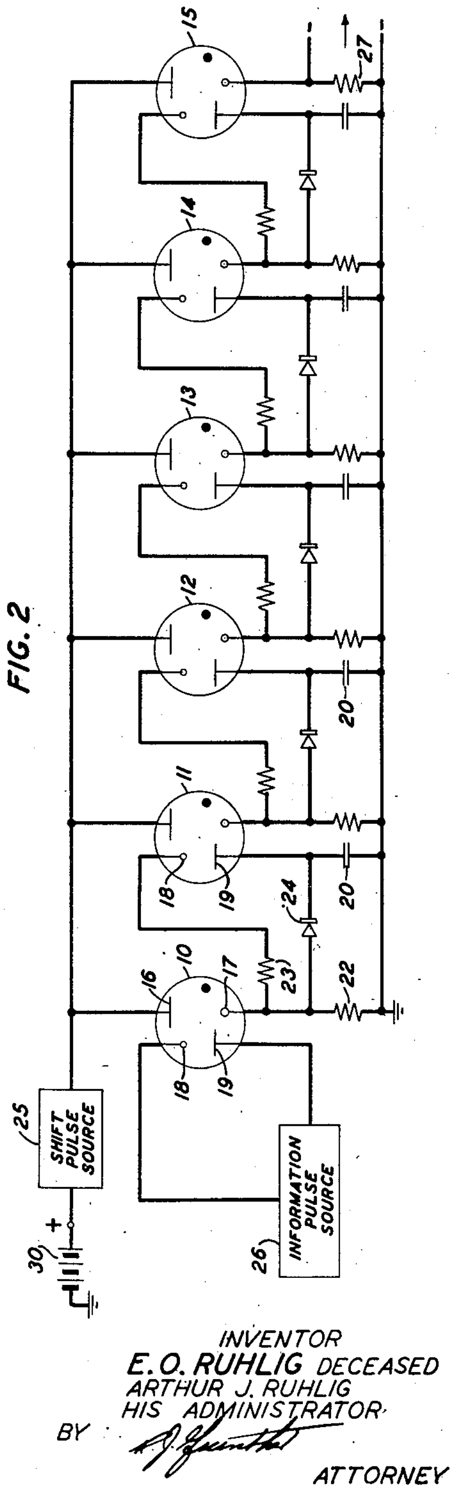

The invention and the above noted and other features thereof will be understood more clearly and fully from the following detailed description with reference to the accompanying drawing in which Figs. 1 and 2 are circuit diagrams depicting two illustrative embodiments of this invention.

Referring now to the drawing, the shift register circuit illustrated in Fig. 1 comprises a series of similar gaseous discharge devices 10 to 15, inclusive, each of which comprises a main anode 16, a main cathode 17, and auxiliary or starter cathode and anode 18 and 19 respectively. For purposes of illustration six discharge devices have been shown. It will be understood that a greater or lesser number may be utilized.

Coupled to the starter anode 19 of each of the devices 11 to 15, inclusive, is a corresponding condenser 20, one terminal of each condenser being grounded as shown and the other connected to the main cathode 17 of the preceding discharge device through a rectifier 24. Each condenser forms a part of a network including resistors 21, 22 and 23, the resistors 21 and 22 being connected in series with the main gap of the respective devices 10 through 14 and each resistor 23 being connected between the common terminal of the two other resistors and the auxiliary or starter cathode of the next succeeding device.

The main anodes of the several devices are connected in common to a source 30, biasing these anodes normally at a potential sufficient to sustain a discharge in any main gap. The main anode potential is reduced periodically to a value below the sustaining potential by negative shift pulses applied from a source 25. Information pulses of amplitude sufficient to initiate a discharge in the starter gap of the first discharge device 10 are applied to that starter gap from a source 26. An output or load element 27 represented by the resistor 27 is connected in the main gap circuit of the last discharge device 15 in the series.

The operation of the circuit will be understood from the following considerations. Assume that as a result of an appropriate pulse from the information source 26, the discharge device 10 is conducting. It is evident that due to the main gap current in device 10, the condenser 20 will charge toward the potential of the main cathode 17 of the device 10, positive with respect to ground, the absolute magnitude being dependent upon the values of the resistors 21 and 22 in series with the main gap of the device 10. These values are made such that the condenser potential is somewhat above the breakdown potential for the starter gap of the discharge device 11. It will be noted that with a discharge in the main gap of the device 10, by virtue of the drop across the associated resistor 22, the auxiliary cathode 18 of the device 11 is biased positive with respect to ground. The resistor 22 is made of such value that as a result of this bias, the net potential across the starter gap of the device 11 is insufficient to effect initiation of a discharge in this gap.

When a negative shift pulse is applied to the main anodes, the main anode potential is decreased below the sustaining value. Consequently, the discharge in the main gap of device 10 is extinguished, the drop across the resistor 22 disappears and the positive bias upon the auxilary cathode 18 of the device 11 is removed. Thus, the potential of the condenser 20 now is sufficient to establish a discharge in the starter gap of the device 11. Upon cessation of the shift pulse, a discharge is established in the main gap of this device. Hence, in effect, in response to the shift pulse, a discharge is stepped from the main gap of device 10 to the main gap of the device 11.

In like manner, as will be evident, a discharge sustaining at the main gap of any of the other devices, except the last, in the series will be stepped one position in response to a shift pulse.

In a typical circuit wherein the nominal main gap current for each of the discharge devices 10 to 15 is 10 ma. for a main anode potential of 180 volts and the starter gap breakdown voltage is 100 volts, the following parameters have been found satisfactory:

| | |
|---|---|
| Resistor **21** | 7000 ohms. |
| Resistor **22** | 3000 ohms. |
| Condenser **20** | 0.5 mmf. |
| Shift pulse | 180 volts negative and 5 ms. duration. |

Each resistor 23 prevents self priming of the discharge device with which it is associated. Assume, for example, that a discharge is sustaining in the main gap of the device 11 but not in that of the device 10. The auxiliary or starter cathode 18 of the device 11 will draw some current from the main gap discharge so that a voltage develops across the resistor 22 in series with the main gap of the preceding device 10 and the starter cathode of device 11 is biased accordingly. However, the resistor 23, if of at least a certain magnitude will assure that the drop across the resistor 22 noted is insufficient to cause breakdown of the starter gap of the device 11 when the discharge in the main gap of this device is extinguished as the result of a shift pulse. For the specific example given hereinabove, resistors 23 of 160,000 ohms have been found satisfactory.

It will be understood that any pattern of conducting and non-conducting devices can be established in the series by correlation of the information and shift pulses. Specifically, application of information pulses from source 26 concurrently with or following a shift pulse from source 25 will render the device 10 conducting so that in response to the next shift pulse a "1" will be stored in the device 11. If no information pulse is applied between two consecutive shift pulses no discharge, representative of a zero, obtains at the device 11. Also it will be evident that any pattern extant in the series is stepped one position or stage to the right, in Fig. 1, in response to each shift pulse.

Information stored in the circuit may be read out either serially or simultaneously. In the former case, read out pulses and no pulses are obtained sequentially at the output resistor 27. In the latter case, the condition of any number of the stages may be detected concurrently, as by the potentials across the resistors 22.

In the embodiment of the invention depicted in Fig. 2, the started anode 19 of each of the similar discharge devices 11 to 15, inclusive, is connected to ground through a respective condenser 20. The starter cathode of each of these devices is connected to the main cathode 17 of the preceding discharge device through the resistor 23. Assume that a discharge is sustaining in the main gap 16, 17 of the discharge device 10. The starter cathode 18 of the device 11 then is driven to a positive potential toward that of the main cathode 17 of device 10. Further, the condenser 20 associated with the starter anode 19 of device 11 is charged to a potential corresponding to the drop across the resistor 22 in series with the cathode 17 of the device 10, which potential is somewhat above the breakdown voltage for the starter gap 18, 19 of the device 11. However, initiation of a discharge in this starter gap is inhibited because of the positive potential upon the starter cathode. When, in response to a shift pulse from the source 25, the discharge in the device 10 is extinguished, the starter cathode of device 11 falls to ground potential and the condenser 20 above noted, by discharging, initiates a discharge in the starter gap of the device 11. Upon cessation of the shift pulse a discharge is established in the main gap of the device 11. Thus, as in the embodiment of this invention illustrated in Fig. 1, in the shift register represented in Fig. 2 a discharge sustaining at any main gap is shifted to the main gap of the next succeeding discharge device upon application of a shift pulse. Also in the shift register of Fig. 2, the resistors 23 are made of such magnitude as to prevent self priming of the discharge devices.

In the embodiment represented in Fig. 2 it is advantageous that the inverse breakdown voltage of the starter gaps be greater than the forward breakdown voltage to prevent false inverse firing of a starter gap resulting from a delay of voltage rise on the anode.

Although specific embodiments of this invention have been shown and described, it wil be understood that they are but illustrative and that various modifications may be made therein without departing from the scope and spirit of this invention.

What is claimed is:

1. An impulse responsive circuit comprising a series of gaseous discharge devices each having a main gap and a starter gap, means simultaneously applying a sustaining voltage across all the main gaps of said devices, means for rendering any device in said series conductive, and means for concomitantly rendering the conductive device non-conductive and the next succeeding device conductive comprising a plurality of condensers each connected in series with the starter gap of a respective device, means for charging each condenser in accordance with main gap current in the next preceding device, resistance means in series with the main gap of each device for reducing the potential across the starter gap of the next succeeding device and means for momentarily decreasing the voltage across said main gaps below the sustaining value.

2. An impulse responsive circuit comprising a series of gaseous discharge devices each having a main anode, a main cathode, a starter anode and a starter cathode, means biasing the main anodes of said devices to sustain a discharge in the main gap thereof, means for rendering the main gap of the first device in said series conductive, and means for rendering the series of devices conductive in succession, said last means comprising a plurality of condensers each connected between the starter cathode and starter anode of a respective one of said devices, a charging circuit for each condenser including a resistor in series with the main gap of the next preceding device, and constructed to charge the condenser to a potential sufficient to enable conduction in the starter gap associated therewith, means for inhibiting conduction in any starter gap including a plurality of resistors each in circuit with a respective starter cathode and the main cathode of the next preceding device and connected to bias the associated starter cathode positive while the preceding device is conducting, and means for momentarily decreasing the bias upon said main anodes below the sustaining voltage.

3. An impulse responsive circuit comprising a series of gaseous discharge devices each having a main cathode and a main anode defining a main gap, and having also an auxiliary anode and an auxiliary cathode defining a starter gap, means biasing the main anodes to the sustaining voltage, means for rendering the first device in said series conducting, a condenser connected between the auxiliary cathode and auxiliary anode of each but the first device in said series, means for charging each condenser to a potential sufficient to maintain conduction in the associated starter gap including an impedance in series with the main gap of the next preceding device, means for inhibiting conduction in the starter gap of any device when the next preceding device is conducting comprising a plurality of resistors each in series with the starter gap of a respective device and the main gap of the next preceding device, and means for momentarily reducing the main anode bias below the sustaining voltage.

4. An impulse responsive circuit in accordance with claim 3 comprising resistance means in circuit with each auxiliary cathode for preventing self priming of said devices.

5. A shift register circuit comprising a series of gaseous discharge devices each having a main cathode and a main anode defining a main gap and having also an auxiliary anode and an auxiliary cathode defining a starter gap, means applying a potential across all the main gaps sufficient to sustain a discharge therein, an information pulse source in circuit with the starter gap of the first device in said series, means for applying to the starter gap of each of said devices but the first a voltage component above the breakdown potential of the starter gap, in response to conduction in the main gap of the next preceding device, means for inhibiting conduction in the starter gap of any of said devices by said component comprising means energized in accordance with the main gap current of each device for biasing the cathode of the next succeeding device positive, and means for applying negative shift pulses to the main anodes of said devices.

6. A shift register circuit comprising a series of gaseous discharge devices each having a main cathode and a main anode defining a main gap and having also an auxiliary anode and an auxiliary cathode defining a starter gap, means applying a potential across all the main gaps sufficient to sustain a discharge therein, an information pulse source in circuit with the starter gap of the first device in said series, a plurality of resistors each in series with the main gap of a respective one of said devices and having one terminal connected to the main cathode of the respective device and also to the auxiliary cathode of the next succeeding device in the series, whereby upon flow of main gap current in any device, the auxiliary cathode of the next succeeding device is biased in accordance with said current, a plurality of condensers each having one terminal connected to the main cathode of a respective one of said devices and also to the auxiliary anode of the next succeeding device and its other terminal connected to the other terminal of the corresponding one of said resistors, whereby in response to flow of main gap current in any device the condenser associated therewith is charged, the constants of the charging circuit for each condenser being such that the condenser potential is somewhat above the breakdown potential of the associated starter gap and each resistor being such that breakdown of the associated starter gap is inhibited by virtue of the bias upon the associated auxiliary cathode due thereto, and means for applying shift pulses to said main anodes.

7. A shift register circuit comprising a series of gaseous discharge devices each having a main cathode and a main anode defining a main gap and having also an auxiliary anode and an auxiliary cathode defining a starter gap, means applying a potential across all the main gaps sufficient to sustain a discharge therein, an information pulse source in circuit with the starter gap of the first device in said series, means connecting the auxiliary cathode of each but the first device in said series to the main cathode of the next preceding device, a plurality of resistors each in series with the main gap of a respective one of said devices and connected to the main cathode thereof, whereby in response to current flow in the main gap of any device a positive bias is applied to the auxiliary cathode of the next succeeding device, means for applying a priming voltage to the starter gap of each device in response to conduction in the main gap of the next preceding device including a plurality of condensers each connected across a corresponding one of said resistors and having one terminal connected to the auxiliary anode of the respective succeeding device, and means for applying shift pulses to the main anodes of said devices.

8. An impulse responsive circuit comprising a series of gaseous discharge devices each having a main anode, a main cathode, a starter anode and a starter cathode, means biasing the main anodes of said devices to sustain a discharge in the main gap thereof, means rendering the main gap of the first device in said series conductive, and means for rendering said series of devices conductive in succession, said last-mentioned means comprising a plurality of condensers each connected between the starter anode and starter cathode of a respective one of said devices, a charging circuit for each condenser including a resistor in series with the main gap of the next preceding device and a unilateral impedance connected between said resistor and said condenser to charge the condenser to a potential sufficient to enable conductance in the starter gap associated therewith, means inhibiting conduction in said last-mentioned starter gap, and means for momentarily decreasing the bias upon said main anodes below the sustaining voltage.

References Cited in the file of this patent

UNITED STATES PATENTS 2,593,109 Craft ------------------ Apr. 15, 1952